United States Patent [19]
Villani et al.

[11] Patent Number: 5,967,151
[45] Date of Patent: *Oct. 19, 1999

[54] HAIR BEAD STOP AND METHOD OF BEADING HAIR

[75] Inventors: Anthony Villani; Kathy Kennedy, both of Rancho Santa Margarita, Calif.

[73] Assignee: Beadwear, Inc., Rancho Santa Margarita, Calif.

[ * ] Notice: This patent is subject to a terminal disclaimer.

[21] Appl. No.: 09/094,110

[22] Filed: Jun. 9, 1998

Related U.S. Application Data

[63] Continuation-in-part of application No. 08/923,239, Sep. 4, 1997, which is a continuation of application No. 08/588,425, Jan. 18, 1996, Pat. No. 5,687,751.

[51] Int. Cl.$^6$ ........................................ A45D 2/36
[52] U.S. Cl. ..................... 132/200; 132/212; 132/270; 132/271; 24/115 G; 24/136 L
[58] Field of Search ................... 132/212, 270, 132/200, 273, 330, 332, 271; 66/117, 118; 606/139, 144, 148, 205, 208, 206; 219/143, 129; 223/50, 105, 99; 119/807, 808; 29/433, 241; 24/115 G, 136 L, 115 N, 115 F

[56] References Cited

U.S. PATENT DOCUMENTS

| | | |
|---|---|---|
| 1,144,504 | 6/1915 | Schneider .................................. 223/99 |
| 2,567,408 | 9/1951 | Soderberg . |
| 3,045,684 | 7/1962 | Stolz . |
| 4,315,362 | 2/1982 | Pigford et al. . |
| 4,622,723 | 11/1986 | Krauss . |
| 4,675,948 | 6/1987 | Bengtsson . |
| 4,771,516 | 9/1988 | Foth . |
| 4,779,616 | 10/1988 | Johnson . |
| 4,782,560 | 11/1988 | Keller . |
| 5,197,166 | 3/1993 | Meier et al. . |
| 5,224,245 | 7/1993 | Matoba . |
| 5,323,514 | 6/1994 | Masuda . |
| 5,345,657 | 9/1994 | Shimizu . |
| 5,365,954 | 11/1994 | Rude . |
| 5,417,230 | 5/1995 | Wood . |
| 5,444,897 | 8/1995 | Gross . |
| 5,456,271 | 10/1995 | Legette . |
| 5,511,567 | 4/1996 | Cefis . |
| 5,558,105 | 9/1996 | Rosenwinkel et al. . |
| 5,562,688 | 10/1996 | Riza . |
| 5,573,017 | 11/1996 | Post . |
| 5,573,018 | 11/1996 | Johnson . |
| 5,590,670 | 1/1997 | Allred . |
| 5,611,118 | 3/1997 | Bibbee ................................. 24/115 G |
| 5,621,952 | 4/1997 | Frano ................................... 24/115 G |
| 5,657,513 | 8/1997 | Takahashi . |
| 5,664,707 | 9/1997 | Spector . |
| 5,666,699 | 9/1997 | Takahashi ........................... 24/115 G |
| 5,671,505 | 9/1997 | Anscher .............................. 24/115 G |
| 5,671,509 | 9/1997 | Yeung . |
| 5,687,751 | 11/1997 | Villani .................................... 132/200 |
| 5,697,128 | 12/1997 | Peregrine . |
| 5,737,808 | 4/1998 | Ikeda .................................... 24/115 G |

FOREIGN PATENT DOCUMENTS 64309   12/1913   Australia ............................. 24/115 G

*Primary Examiner*—Gene Mancene
*Assistant Examiner*—Pedro Philogene
*Attorney, Agent, or Firm*—R. Scott Weide

[57] ABSTRACT

A hair bead stop and method of beading hair are disclosed. The bead stop comprises a first element with a passage therethrough and a second element movably mounted to the first element. In accordance with the method, the bead stop is threaded along a tool having a threader defining an aperture. At least one bead is also placed on the tool. Hair is passed through the aperture of the tool and then the bead and bead stop are moved along the tool over the aperture through which the hair extends, placing the bead and bead stop on the hair. Upon removal of the hair from the tool, the second element of the bead stop is moved with respect to the first to bind the hair between a first surface defined by the first element of the bead stop in the passage and an opposing surface of the second element. The bead(s) are maintained on the hair by the bead stop which is placed closer to the free end of the hair.

16 Claims, 4 Drawing Sheets

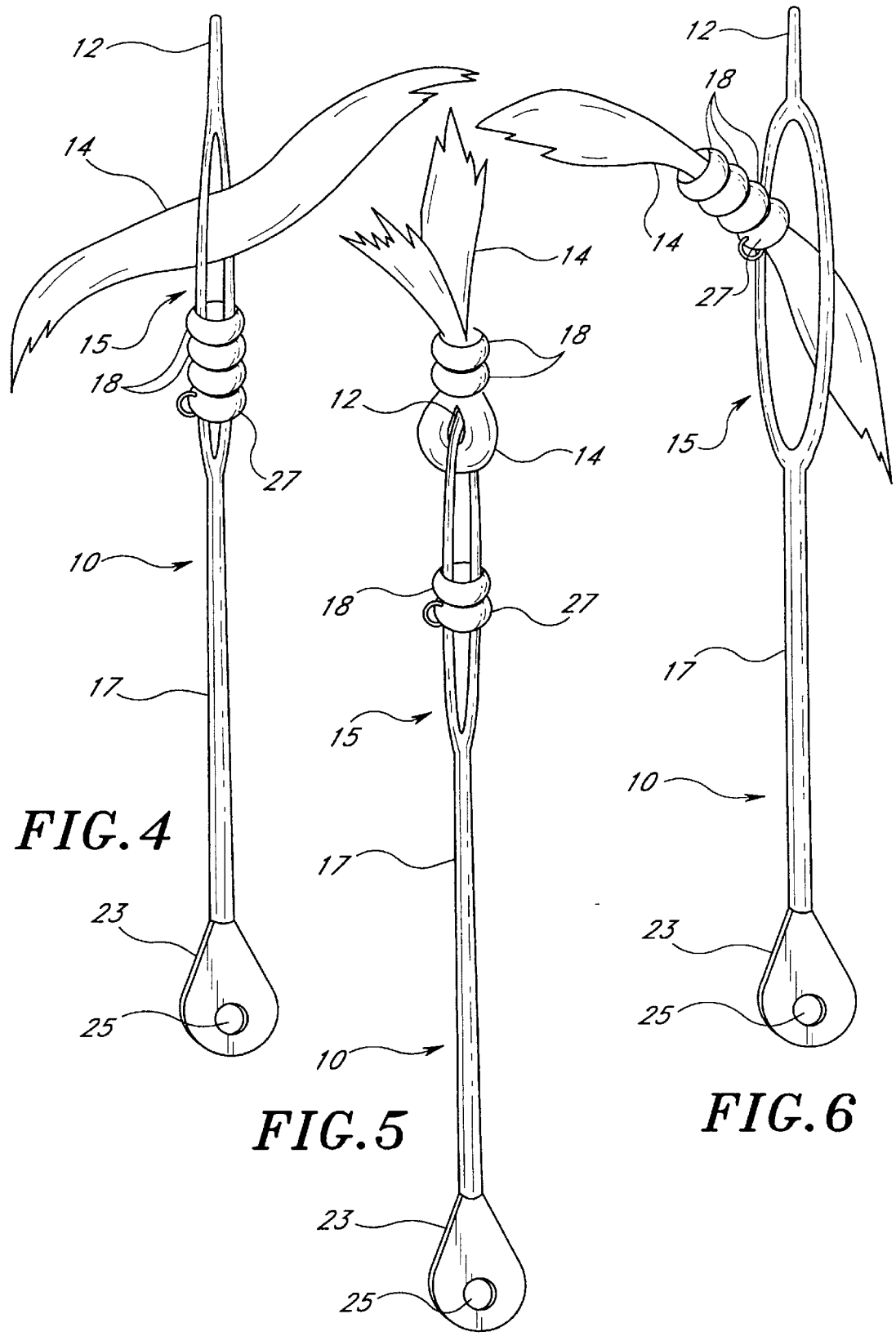

HAIR BEAD STOP AND METHOD OF BEADING HAIR

RELATED APPLICATIONS

This application is a continuation-in-part of U.S. application Ser. No. 08/923,239, filed Sep. 4, 1997, now pending which is a continuation application of U.S. application Ser. No. 08/588,425, filed Jan. 18, 1996, now issued as U.S. Pat. No. 5,687,751, issued Nov. 18, 1997.

FIELD OF THE INVENTION

The present invention relates to hair beading, and more particularly, to a stop for retaining hair beads on hair and a method of beading hair.

BACKGROUND OF THE INVENTION

It is a common and popular practice to use beads to ornament hair. This practice is usually performed by putting beads in the hair manually or putting foil around the hair and stringing beads over the foil. Another method that has been used is threading beads over a needle with a loop of string attached, passing the bead over the string, and then threading the hair through the loop. The beads are then backed over the loop and onto the band of hair.

Manual hair beading, however, is time consuming. The string method is hard to use because of its high degree of flexibility, and the needle is hazardous and not suitable for small children.

Another problem associated with hair beading is retaining the beads on the hair. A rubber band wrapped around the hair, a small hair clip or the like may be used for this purpose, but all detract from the beauty of the hair beads and are difficult to use.

There is desired a hair bead stop and improved method for beading hair in which the beads are retained on the hair with such a hair bead stop.

SUMMARY OF THE INVENTION

The present invention is a hair bead stop and a method of beading hair utilizing at least one bead stop.

The bead stop includes a pin and a body. In a first embodiment, the body has a through passage and a bore which extends generally perpendicular to the through passage. The pin has a stem portion located in the bore of the body. A passage also extends through the stem of the pin.

Means are provided for biasing the pin into a first position in which the passage through the stem is offset from the passage through the body. The pin is moveable against the spring force into a second position in which the passages through the pin and body are generally aligned and one or more strands of hair may be passed through the stop.

In accordance with the method of the present invention the bead stop is threaded along a tool having a threader defining an aperture. At least one bead is also placed on the tool. Hair is passed through the aperture of the tool and then the bead and bead stop are moved along the tool over the aperture through which the hair extends, placing the bead and bead stop on the hair. Upon removal of the hair from the tool, the pin is biased into its first position, the offset pin and body of the stop binding the hair and locking the bead stop onto the hair. The bead(s) are maintained on the hair by the bead stop which is placed closer to the free end of the hair.

In a second embodiment, the bead stop again comprises a body and a pin, the body having a main passage there-through. The pin has a stem portion with a first end and a second end at which is located a head. The pin threadingly engages the body. The pin is moveable into a position in which the first end of the stem extends into the passage through the body and binds hair extending through the passage against the wall of the body defining the passage.

Further objects, features, and advantages of the present invention over the prior art will become apparent from the detailed description of the drawings which follows, when considered with the attached figures.

BRIEF DESCRIPTION OF THE DRAWINGS

FIG. 4 is a view of the tool illustrated in FIG. 1 in which the beads are passed up the elongated-cylindrical shaft and onto the flexible threader of the hair beading tool;

FIG. 5 is a view of the tool illustrated in FIG. 1 in which two beads have been moved over the flexible threader and onto the hair, and one bead and the stop remains on the flexible threader of the hair beading tool;

FIG. 6 is a view of the tool illustrated in FIG. 1 in which all three beads and the bead stop are mounted on the portion of hair and released from the tool, the bead stop engaging the portion of hair and preventing the beads from falling from the portion of hair;

DETAILED DESCRIPTION OF THE PREFERRED EMBODIMENT

In general, the present invention is a hair bead stop and a method of placing and retaining hair beads on hair including use of the hair bead stop.

Figures 1, 2, 3:
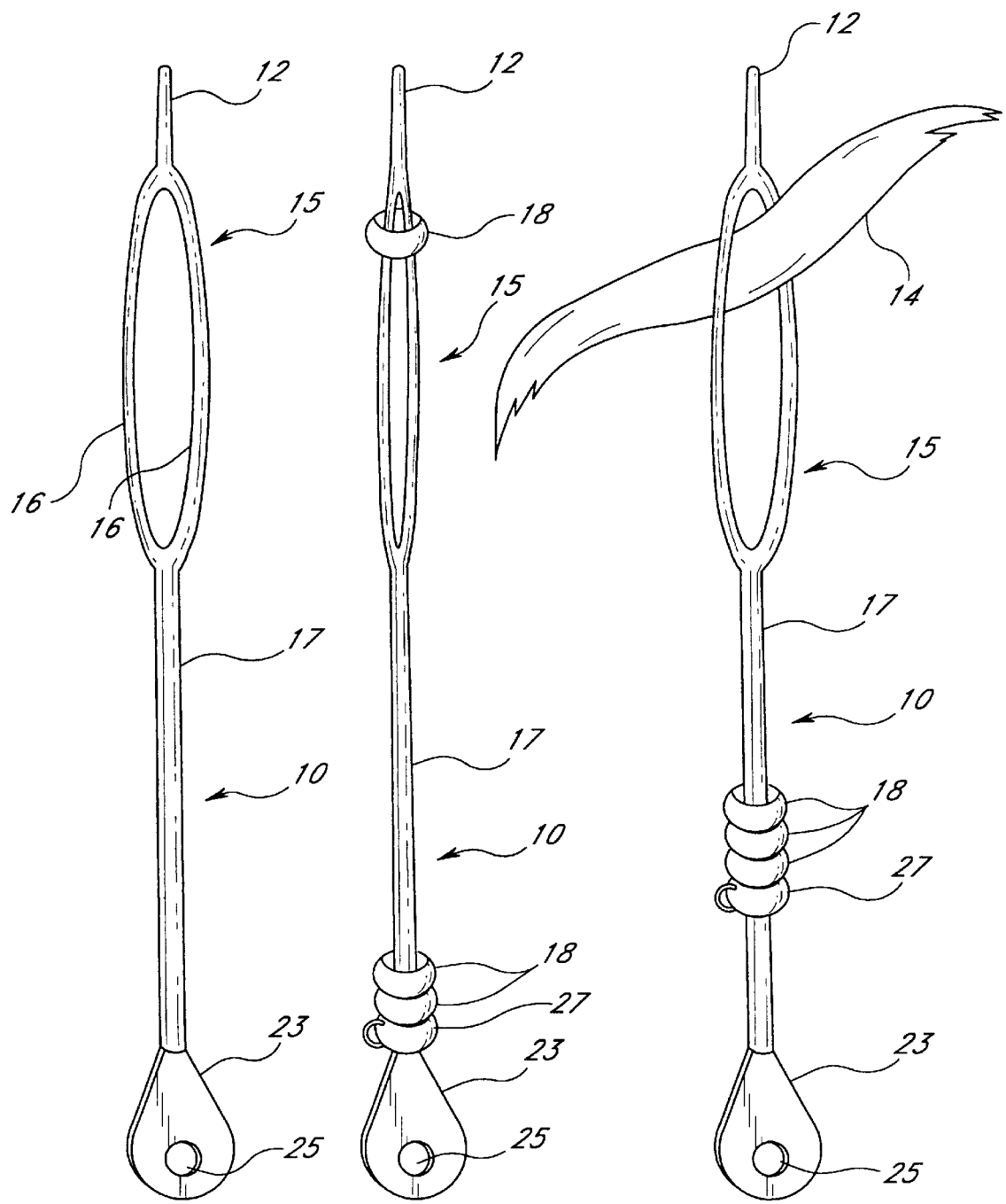
FIG. 1 is a side view of the preferred embodiment of a hair beading tool for placing hair beads and a bead stop on hair in accordance with the present invention.
FIG. 2 is a view of the tool illustrated in FIG. 1 in which three beads and a single bead stop are being mounted onto the tool: one of the beads being threaded past a rounded-needle tip and onto a flexible threader, the remaining two beads and the stop positioned on an elongated-cylindrical shaft of the tool.
FIG. 3 is a view of the tool illustrated in FIG. 1 in which the beads and stop are all mounted onto the elongated shaft of the tool and a portion of hair has been passed through the loop of the flexible threader.
Figure 7:
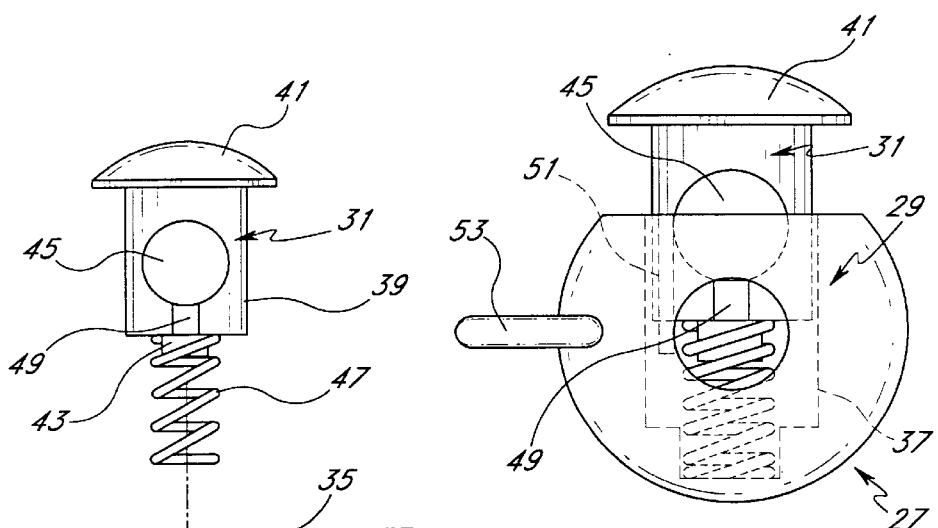
FIG. 7 is an exploded view of the bead stop in accordance with the present invention.

Referring now to the drawings, FIG. 1 shows a tool 10 for placing one or more hair beads 18 and a bead stop 27 on hair in accordance with the present invention. FIGS. 2–6 illustrate a method of placing and retaining the hair beads 18 on hair using this tool 10 and the bead stop 27.

While the bead stop 27 and method of the present invention are useful in placing and retaining hair beads 18 on one or more strands of hair, those of skill in the art will appreciate that the invention may be used to place and retain beads on cloth, string, cord or other similar materials.

The hair beads 18 may be of a variety of shapes and sizes and be constructed from a variety of materials. Preferably, each hair bead 18 has the common feature of a passage extending therethrough. In the case where the beads 18 are generally spherical, it is common for the passage to extend along a diameter through the bead.

The hair beading tool 10 will now be described in detail with reference to FIG. 1. As illustrated therein, the tool 10 has a proximal end in the form of a rounded needle tip 12 having semirigid properties which is sized and shaped to permit beads 18 to be guided thereover and onto the tool 10 with minimal effort. In other words, the tip 12 is shaped and sized to easily extend into the passage through each bead 18.

Distal of the rounded needle tip 12 of the tool 10 is a flexible threader 15. In the preferred embodiment, the flexible threader 15 comprises a pair of identical flexible shafts 16. Each shaft 16 of the flexible threader 15 has a first end, an opposing second end, and a middle portion.

In a resting position, each of the shafts 16 is curved, with the first ends of the shafts 16 curving towards one another at their point of joinder in the form of a syncline, and the second ends of the shafts 16 similarly curving inward towards one another. In this arrangement, the middle portions of the shafts 16 are separated by some distance. So arranged, the shafts 16 cooperate to define an aperture which is slightly convex, having ends in the form of an acute ogive.

Each of the two shafts 16 that comprise the flexible threader 15 have flexible, resilient properties so the threader can be flexed, changing the shape of the aperture define therebetween and changing the distance between the middle portions of the shafts 16. In particular, the shafts 16 are moveable between a resting position as illustrated in FIG. 1 in which the shafts 16 are some distance apart, and a position as illustrated in FIG. 2 in which the shafts 16 are closer to one another and the "width" of the aperture is lessened.

In the position illustrated in FIG. 1, the shafts 16 are separated by a distance which prevents a bead 18 which is placed on the tool 10 from falling off once it is passed over the threader 15 (as described in more detail below). In addition, when the shafts 16 are in this position the aperture defined therebetween is large enough to easily permit the passage of one or more strands of hair therethrough, as illustrated in FIG. 3. On the other hand, in the position illustrated in FIG. 2 where the shafts 16 are pressed together, one or more beads 18 may be moved along the tool over the flexible threader portion 15.

Distal of the flexible threader 15 of the tool 10 is an elongate cylindrical shaft 17 portion of the tool. This shaft portion 17 is of a length and diameter designed to accept several beads 18 and at least one bead stop 27.

At the distal end of the tool 10 opposite the tip 12 there is a swaged teardrop base or handle 23. The base 23 has a rounded orifice 25 for hanging the tool when not in use. The base 23 is of a size which is designed to prevent the beads 18 and stop 27 from falling off of the tool 10 at its distal end. Preferably, the base 23 not only serves as a stop, but is shaped for gripping by a user of the tool 10.

In accordance with the preferred embodiment, at least the flexible threader portion 15 of the tool comprises a flexible, resilient material that can be repeatedly flexed without fracturing. More preferably, the entire tool 10 comprises such a material, as such permits the tool 10 to be injection molded from a material such as a polyurethane. However, the tool can consist of any other material that has flexible and resilient properties, such as: nylon, rubber, and some types of plastics. In addition, different sections of the tool 10 may comprise different materials. For example, the shaft 17 may comprise a rigid plastic, while the threader portion 15 may comprise a flexible plastic. The tool 10 may also be constructed from metal, such as thin wire.

The hair bead stop 27 in accordance with the present invention will be described with reference to FIGS. 7–11. As illustrated therein, the bead stop 27 preferably comprises a body 29, a pin 31, and means for biasing the pin 31 with respect to the body 29.

The body 29 is preferably generally spherical in outer shape. A portion of the "sphere" is cut away, defining a flat surface 35. A bore or passage 33 extends through the center of the body 29. Preferably, the bore 33 is large enough to accept a portion of hair.

A second bore 37 extends from the flat surface 35 into, but not through, the body 29. The second bore 37 extends perpendicular to the first passage 33. The second bore 37 has a first enlarged diameter portion and a second reduced diameter portion. The reduced diameter portion is positioned opposite the flat surface 35.

The pin 31 comprises a stem 39 and a head 41. The stem 39 is sized to fit within the second bore 37 of the body 29. Preferably, when the bore 37 in the body 29 is cylindrical in shape, the stem 39 of the pin 31 is also cylindrical and has a diameter slightly smaller than the diameter of the second bore.

A boss 43 extends from the stem 39 at one end, while the head 41 is positioned at the opposite end. The boss 43 is preferably cylindrical and of a smaller diameter than the stem 39. The boss 43 is adapted to fit within the reduced diameter portion of the second bore 37.

The head 41 has a generally flat bottom surface for abutting the flat surface 35 of the body 29, and a top curved surface. When the pin 31 is depressed into the second bore 37 of the body 29 as illustrated in FIG. 8, the head 41 of the pin 31 preferably cooperates with the body 29 to complete the sphere defining the outer surface of the stop 27 (giving it a similar appearance to a bead 18).

A main passage 45 extends through the stem 39 of the pin 31. Preferably, the passage 45 extends through the pin 31 perpendicular to a line extending along the axis of the stem 39 through the head 41 and boss 43.

Figure 8:
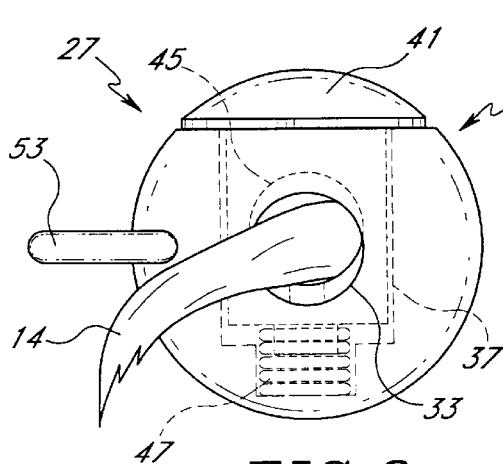
FIG. 8 is a side view of the bead stop illustrated in FIG. 7 with the pin thereof depressed to permit passage of hair through an aligned passage through the pin and a body of the stop.
Figure 9:
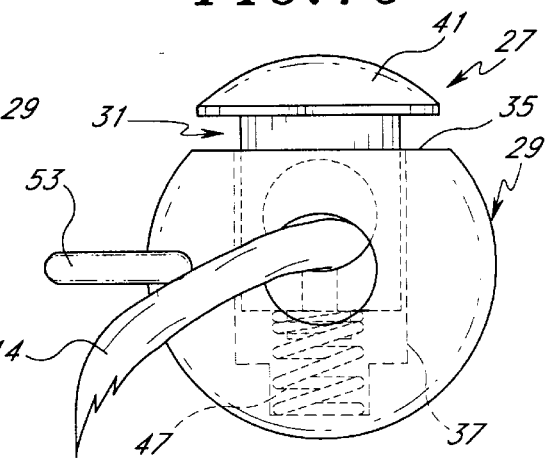
FIG. 9 is a side view of the bead stop illustrated in FIG. 8 with the pin biased outwardly wedging the hair between the offset pin and body of the stop.

As illustrated in FIGS. 8 and 9, the pin 41 is arranged to be moved with respect to the body 29 into two positions. In a first position, the pin 31 is depressed into the body 29 into a position in which the main passage 45 through the pin 31 and the passage 33 through the body 29 are generally aligned. In a second position, the pin 31 is biased upwardly into a position in which the main passage 45 through the pin 31 and the passage 33 through the body 29 are at least partially offset.

As stated above, means are provided for biasing the pin 31 with respect to the body 29. Preferably, this means comprises a spring 47 which is arranged to bias the pin 31 upwardly into its second position. As illustrated, the spring 47 is preferably a coil spring. The spring 47 has a first end which extends over the outside of the boss 43 on the stem 39, and a second end which fits within the reduced diameter section of the second bore 37 of the body 29.

Figure 10:
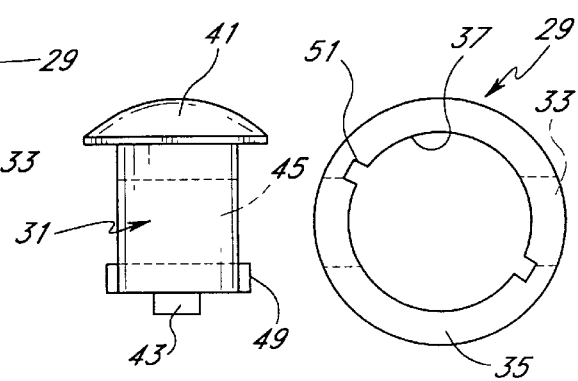
FIG. 10 illustrates the pin in side view and the body in top view when disassembled from one another.

Referring primarily to FIG. 10, means are provided for retaining the pin 31 connected to the body 29, i.e. preventing the spring 47 from pressing the pin 31 completely out of the body 29. Preferably, this means comprises a pair of tabs 49 on the stem 39 of the pin 31 for engagement with portions of the body 29.

The tabs 49 extends outwardly (radially) of the main portion of the stem 39 on opposing sides thereof below the main passage 45 where it exits the stem 39. A pair of similarly spaced opposing grooves 51 extend through the body 29 parallel to the second bore 37. The grooves 51 are positioned in the wall of the body 29 which define the second bore 37, thereby effectively increasing the diameter or size of the second bore 37 in those locations. The grooves 51 extend adjacent the first passage 33 and preferably terminate at a level approximately equal to or above the bottom of the passage 33 through the body 29.

In assembly, the tabs 49 on the pin 31 are aligned with the grooves 51. The pin 31 is pressed downwardly into the body 29 until the tabs 49 hit the bottom of the grooves 51. The pin 31 is then rotated slightly so that the tabs 49 move into the passage 33 through the body 29.

Figure 11:
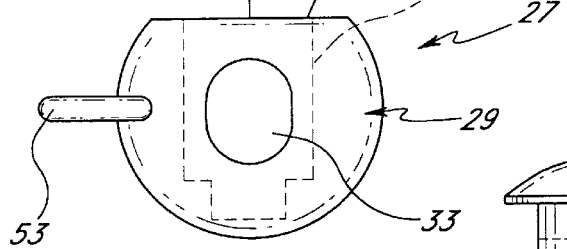
FIG. 11 illustrates the pin biased outwardly by a spring from the body.

Referring to FIG. 11, when the spring 47 biases the pin 39 outwardly of the body 29, the tabs 49 engage the body 29 at the top of the main passage 33 therethrough, maintaining the pin 31 coupled to the body 29.

In the preferred embodiment, the bead stop 27 includes a loop element 53. This element 53 is attached to the outside of the body 29 of the bead stop 27 and cooperates therewith to define an enclosed loop. The element 53 may be gripped by a user of the stop 27 for picking it up, and also permits the bead stop 27 to be threaded onto a string or other item for storage or display.

The method of the present invention in placing and retaining at least one hair bead 18 on hair with the bead stop 27 and using the tool 10 as described above is as follows.

First, at least one stop 27 is guided over the tip 12 of the tool 10 and threaded therealong over the threader 15 onto the shaft 17. In order to place the stop 27 on the tool 10 it is necessary to depress the pin 31 so that the main passage 45 therethrough aligns with the passage 33 through the body 29 as illustrated in FIG. 8.

Next, one or more beads 16 are threaded over the tip 12 in the same fashion. As illustrated in FIG. 2, this results in the stop 27 being located closest to the handle 23 with the beads 18 located above the stop 27 along the shaft 17.

Advantageously, the flexibility of the threader 15 permits the threader to collapse or compress as illustrated in FIG. 1, permitting passage of the beads 18 and stop 27 thereover.

Once the stop 27 and beads 18 are placed on the tool 10 the threader 15 expands to the position illustrated in FIG. 3. In this position, the threader 15 defines a large aperture through which one or more hair strands may be passed.

After the hair 14 is passed through the aperture of the threader 15, the beads 18 and stop 27 are moved along the elongated cylindrical shaft 17 and back over the flexible threader 15. As the beads 18 and stop 27 move over the threader 15, they also move over the hair 14, which is now doubled over the flexible threader. The beads 18 and stop 27 are moved upwardly along the tool 10 until they are separated from the tool 10 and have passed over the free end of the hair 10.

Once the stop 27 is freed from the tool 10, the spring 27 biases the pin 31 outwardly, pinching the hair 14 between the now misaligned passages 45 in the pin 31 and body 29 as illustrated in FIG. 9. This pinching or wedging of the hair 14 maintains the stop 27 positioned tightly on the hair.

Because the stop 27 is the element positioned nearest the free end of the hair 14, the beads 18 positioned towards the scalp end of the hair are prevented from falling from the hair.

As illustrated in FIG. 9, when the bead stop 27 is locked to the hair 14, the hair is pinched between a top surface defining the passage 33 through the body 29 and a lower surface defining the passage 45 through the pin 31. This binding occurs at both sides of the pin 31 at the pin-to-body interface along the passage 33.

Figure 12:
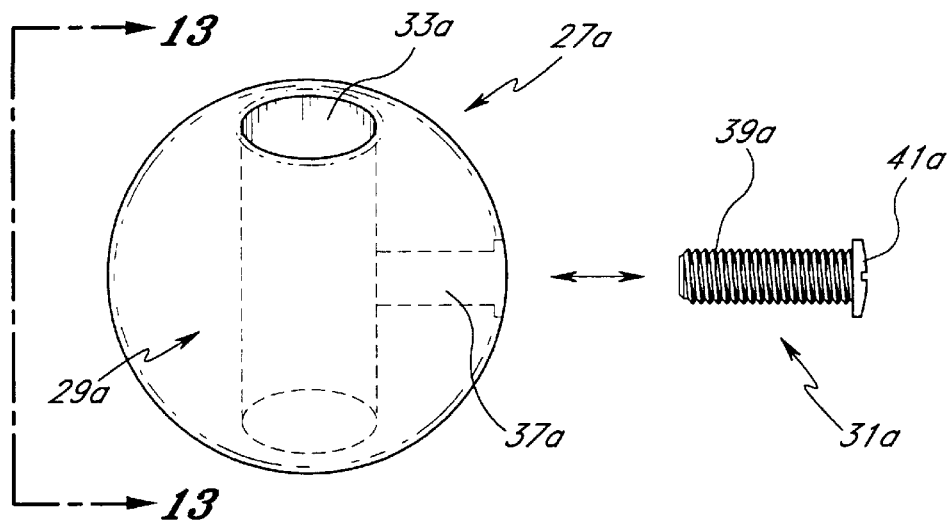
FIG. 12 is an exploded view of a bead stop in accordance with a second embodiment of the present invention.
Figure 13:
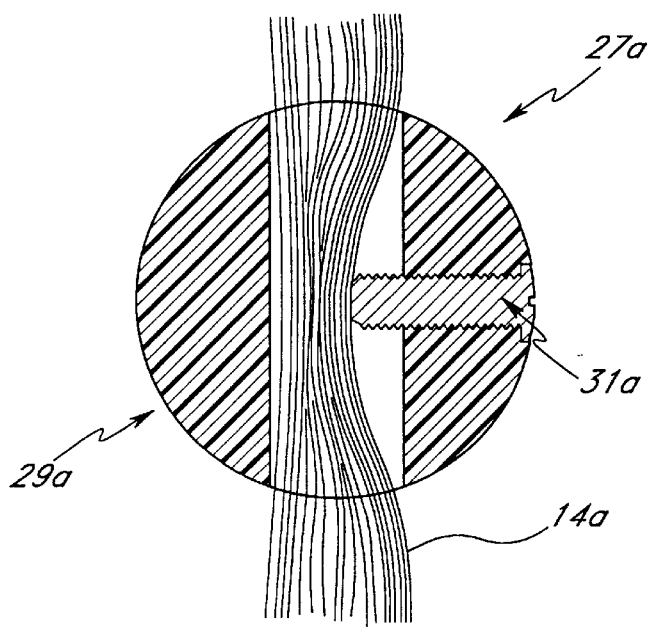
FIG. 13 is a cross-sectional view of the bead stop illustrated in FIG. 12 when placed on hair.

FIGS. 12 and 13 illustrate a bead stop 27a in accordance with a second embodiment of the present invention. This bead stop 27a comprises a body 29a and a pin 31a which may be selectively coupled to the body 29a.

The body 29a may be of a variety of shapes, and as shown is generally spherical. A main passage 33a extends through the body 29a. When the body 29a is spherical, the passage 33a preferably extends along a diameter of the body 29a. The passage 33a may be defined through the body 29a in a variety of locations, however.

A second passage 37a extends into the body 29a from its exterior surface to the main passage 33a. Preferably, this second passage 37a extends generally perpendicular to the main passage 33a. As illustrated, the second passage 37a extends along a radius of the body 29a.

The inside wall of the body 29a defining the main passage 33a is generally smooth. On the other hand, threads are located in the wall defining the second passage 37a.

The pin 31a has a head portion 41a and stem portion 39a extending therefrom. The stem portion 39a is externally threaded for engagement with the threads in the wall defining the second passage 37a.

Preferably, a small counterbore is provided near the surface of the body 29a at the second passage 37a for accepting the head 41a of the pin 31a in an engaged position so that when the pin 31a is connected to the body 29a a smooth outer surface is presented.

As illustrated in FIG. 13, one or more strands of hair 14a may be passed through the main passage 33a. Thereafter, engagement of the pin 31a with the body 29a presses the hair 14a in the passage 33a against the wall, locking the bead 27a to the hair 14a.

This embodiment bead stop 27a may be placed on hair in a method similar to that described above. First, the pin 31a is counter-rotated through the bore 37a to at least a position in which the end of the stem 39a opposite the head 41a does not obscure the main passage 33a. Of course, the pin 31a may be removed entirely.

Next, the stop 27a is placed on the hair beading tool 10 as described above, the tool 10 passing through the main passage 33a. The bead stop 27a is moved up along the tool 10 over hair 14a positioned through the threader portion 15, whereby the hair 14a is positioned through the main passage 33a.

Thereafter, the user tightens the pin 31a into the body 29a until the hair 14a binds between the end of the stem 39a and the opposing wall defining the passage 33a. At this time, the bead stop 27a is secured to the hair 14a.

Those of skill in the art will appreciate that other means may be provided for retaining the pin 31a in a position in which it binds the hair. For example, the pin 31a may be provided with a tab which extends radially outward and engages a slot in the body 29a, the pin 31a rotatable into a position where the tab locks the pin to the body 29a. Alternatively, the pin 31a may have an unthreaded stem 39a and the body 29a may include an element which locks the pin 31a into a depressed position engaging the hair, such as a rotating arm which is moveable over the head of the pin 31a when depressed.

An advantage to this embodiment bead stop 27a is that its construction is simpler than the bead stop 27 described above. This construction permits the bead stop 27a to be extremely small. In addition, the construction of this bead stop 27a permits it to be a greater variety of shapes. The bead stop 27a may be constructed from plastic or for a more decorative effect, metal such as gold or silver.

Those of skill in the art will also appreciate that the bead stops 27,27a may be placed on the hair 14 in manners other than with the tool 10 as described above. For example, the stop 27,27a may be manually placed on hair (in the case of the first stop 27 by simply by depressing the pin 31 and then passing strands of hair through the aligned passages 45,33, or in the second case 27a by threading hair through the bore 22a). The stop 27,27a may also be placed on hair using a needle and string as described in the Background of the Invention portion of the application.

Those of skill in the art will also appreciate that the construction of the bead stop 27,27a may vary from that described above. For example, the means for biasing the pin 31 of the first embodiment bead stop 27 may comprise other than a coil spring. Instead, a compressible rubber cushion or other means may be provided for generating the desired biasing force. It is also contemplated that other locking arrangements for preventing the pin 31 from being biased from the body 29 of the first embodiment bead stop 27 may be employed.

Of course, the foregoing description is that of preferred embodiments of the invention, and various changes and modifications may be made without departing from the spirit and scope of the invention, as defined by the claims.

What is claimed is:

1. A method of placing and retaining one or more beads on hair comprising the steps of:
    providing a bead and stop mounting tool having a proximal end, a distal end and a threader portion therebetween, said threader portion defining an aperture;
    threading a bead stop over said proximal end of said mounting tool and along said tool over said threader portion, said bead stop having a body with a main passage therethrough, a pin having a passage therethrough, said pin moveable between a first position in which said passage therethrough is generally aligned with said main passage and a second position in which said pin is biased with respect to said body so passage through said pin is offset from said main passage;
    threading at least one bead over said proximal end of said mounting tool and along said tool over said threader portion;
    passing at least one strand of hair through said aperture defined by said tool;
    moving said bead and bead stop along said tool over said threader portion onto said hair; and
    removing said hair from said tool, leaving said bead and bead stop positioned on said hair, said bead stop attached to said hair and preventing said bead from falling from said hair.

2. The method in accordance with claim 1, wherein said tool has a stop at said distal end and said method includes the step of moving said at least one bead and bead stop along said tool to said stop.

3. The method in accordance with claim 1, further including the step of biasing said pin of said bead stop into said second position after said step of moving said bead stop onto said hair.

4. A method of retaining at least one bead on hair comprising the steps of:
    positioning at least one bead on a strand of hair between a free end of said hair and an attached end of said hair; and
    positioning a bead stop on said strand of hair adjacent said bead closer said free end of said hair, said step of positioning comprising the steps of generally aligning first and second passages of a bead stop having a first element having said first passage therethrough and a second element having said second passage therethrough, extending said strand of hair through said generally aligned passages, and biasing said first element with respect to said second element into a position in which said first and second passages are offset, whereby said bead stop is locked to said strand of hair.

5. A method of retaining at least one hair bead on at least one strand of hair with a bead stop having a first element and a second element movably connected thereto, said first element having a passage therethrough, comprising the steps of:
    positioning at least one hair bead on a strand of hair between a free end of said hair and an attached end of said hair; and
    positioning said bead stop on said strand of hair adjacent said at least one hair bead closer said free end of said hair, said step of positioning comprising passing said strand of hair through said passage in said first element of said bead stop, and binding said hair between a first surface defined by said first element of said bead stop in said passage and an opposing surface of said second element movably connected to said first element of said bead stop.

6. The method in accordance with claim 5, wherein said first element of said bead stop comprises a body and said second element of said bead stop comprises a pin having a stem with a first end and a head at an opposing second end and said step of binding comprises pressing said strand of hair between a wall of said body defining said passage and said first end of said stem of said pin.

7. The method in accordance with claim 6, wherein said pin threadingly engages said body and said method includes the step of threading said pin into said body until said first end of said stem of said pin engages said strand of hair in said passage.

8. The method in accordance with claim 5, wherein said first element of said bead stop comprises a body and said second element of said bead stop comprises a pin having a stem with a bore therethrough and wherein in said step of binding said strand of hair between a lower surface of said pin defining said bore and an upper surface of said body defining said passage.

9. The method in accordance with claim 8, further comprising the step of biasing said pin outwardly from said body.

10. A bead stop for retaining at least one hair bead on hair comprising a body having a first passage therethrough, a bore extending into said body from an exterior surface, said bore extending generally perpendicular to said first passage, at least one slot positioned in said body and extending from said exterior surface parallel to said bore, at least a portion of said slot in communication with said first passage, a pin having a stem portion at least partially positioned in said bore and movably mounted with respect to said body, said pin having a head connected to said stem and positioned exterior to said bore of said body, said head of said pin and said body cooperating to define a generally spherically-shaped stop, said pin having a passage extending through said stem, said stop further including a spring positioned in said bore between said body and said stem of said pin and biasing said pin in a direction out of said bore, at least one tab extending from said stem portion of said pin, said pin positionable in said body by aligning said at least one tab with said at least one slot and extending said pin into said bore of said body and rotating said pin with respect to said body whereby said tab is positioned in said passage through said body and prevents said pin from falling from said bore by said at least one tab engaging a top portion of said passage defined by said body, said spring biasing said pin into a position in which said passage through said stem thereof is offset from said first passage through said body, said pin moveable to a second position in which said passage through said stem thereof is aligned with said passage through said body, an exterior loop in formed on said stop.

11. The bead stop in accordance with claim 10, wherein said bore has a reduced diameter spring-engaging section.

12. The bead stop in accordance with claim 10, wherein first and second tabs are positioned opposite one another on said stem.

13. The bead stop in accordance with claim 12, wherein a pair of grooves are formed in said body through which said tabs are extended when said pin is extended into said body.

14. The bead stop in accordance with claim 10, wherein said spring has a first end extending over a boss extending from an end of said stem of said pin opposite said head.

15. A bead stop for retaining at least one hair bead on hair comprising a body having a first passage therethrough, a bore extending into said body from an exterior surface, said bore extending generally perpendicular to said first passage, a pin having a stem portion at least partially positioned in said bore and movably mounted with respect to said body, said pin having a head connected to said stem and positioned exterior to said bore of said body, said head of said pin and said body cooperating to define a generally spherically-shaped stop, said pin having a passage extending through said stem, said stop further including a spring positioned in said bore between said body and said stem of said pin and biasing said pin in a direction out of said bore, at least one tab extending from said stem portion of said pin, said tab positioned in said passage through said body and preventing said pin from falling from said bore by engaging said body, said spring biasing said pin into a position in which said passage through said stem thereof is offset from said first passage through said body, said pin moveable to a second position in which said passage through said stem thereof is aligned with said passage through said body, and a loop element connected to said stop and cooperating with an outer surface of said stop to define a passage between said outer surface of said stop and loop element.

16. The bead stop in accordance with claim 15, wherein said loop element is formed integrally with said body.

* * * * *

UNITED STATES PATENT AND TRADEMARK OFFICE
CERTIFICATE OF CORRECTION

PATENT NO. : 5,967,151

DATED : October 19, 1999

INVENTOR(S) : Anthony Villani and Kathy Kennedy

It is certified that error appears in the above-identified patent and that said Letters Patent is hereby corrected as shown below:

In claim 10 at column 9, line 21, "loop in formed" is corrected to read --loop is formed--.

Signed and Sealed this

Twenty-fifth Day of July, 2000

Attest:

Q. TODD DICKINSON

Attesting Officer

Director of Patents and Trademarks